(12) United States Patent
Chen et al.

(10) Patent No.: US 8,767,831 B2
(45) Date of Patent: Jul. 1, 2014

(54) METHOD AND SYSTEM FOR MOTION COMPENSATED PICTURE RATE UP-CONVERSION USING INFORMATION EXTRACTED FROM A COMPRESSED VIDEO STREAM

(75) Inventors: Xuemin Chen, San Diego, CA (US); Brian Heng, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 1270 days.

(21) Appl. No.: 11/931,942

(22) Filed: Oct. 31, 2007

(65) Prior Publication Data

US 2009/0110074 A1    Apr. 30, 2009

(51) Int. Cl.
  *H04N 7/12*   (2006.01)
  *H04N 11/02*  (2006.01)
  *H04N 11/04*  (2006.01)

(52) U.S. Cl.
  USPC .................................................. 375/240.16

(58) Field of Classification Search
  None
  See application file for complete search history.

(56) References Cited

U.S. PATENT DOCUMENTS

| | | | |
|---|---|---|---|
| 2004/0046891 A1 | 3/2004 | Mishima et al. | |
| 2004/0119887 A1* | 6/2004 | Franzen | 348/459 |
| 2005/0265451 A1* | 12/2005 | Shi et al. | 375/240.15 |
| 2006/0002465 A1* | 1/2006 | Raveendran et al. | 375/240.01 |
| 2006/0017843 A1* | 1/2006 | Shi et al. | 348/441 |
| 2006/0018382 A1* | 1/2006 | Shi et al. | 375/240.16 |
| 2006/0159175 A1* | 7/2006 | De Haan | 375/240.16 |
| 2006/0165176 A1* | 7/2006 | Raveendran et al. | 375/240.16 |
| 2006/0256238 A1 | 11/2006 | Mishima et al. | |
| 2007/0014477 A1* | 1/2007 | MacInnis et al. | 382/236 |
| 2007/0071100 A1* | 3/2007 | Shi et al. | 375/240.16 |
| 2007/0076796 A1* | 4/2007 | Shi et al. | 375/240.16 |
| 2007/0211800 A1 | 9/2007 | Shi et al. | |
| 2007/0230563 A1* | 10/2007 | Tian et al. | 375/240.01 |
| 2007/0230578 A1 | 10/2007 | Shi et al. | |
| 2007/0242748 A1* | 10/2007 | Mahadevan et al. | 375/240.14 |
| 2007/0291844 A1* | 12/2007 | Lu | 375/240.16 |
| 2008/0025390 A1* | 1/2008 | Shi et al. | 375/240.02 |
| 2008/0165851 A1* | 7/2008 | Shi et al. | 375/240.16 |
| 2008/0187048 A1* | 8/2008 | Baik et al. | 375/240.16 |
| 2011/0080955 A1* | 4/2011 | Shi et al. | 375/240.16 |

FOREIGN PATENT DOCUMENTS

| | | |
|---|---|---|
| CN | 1981536 A | 6/2007 |
| EP | 0 637 889 A2 | 2/1995 |
| KR | 2007-40397 | 4/2007 |
| WO | 99/57906 | 11/1999 |
| WO | 2005/109899 A1 | 11/2005 |

OTHER PUBLICATIONS

European Search Report in co-pending related EP Application No. 08018476.5, mailed Jan. 2, 2014.

* cited by examiner

*Primary Examiner* — Chirag Shah
*Assistant Examiner* — Suk Jin Kang
(74) *Attorney, Agent, or Firm* — Foley & Lardner LLP (57) ABSTRACT

Certain aspects of a method and system for motion-compensated picture rate up-conversion (PRUC) using information extracted from a compressed video stream may include extracting PRUC data from a compressed video data stream while the compressed video data stream is being decompressed by a video decompression engine. The PRUC data may comprise, for example, local block motion vectors, block coding modes, quantization levels, quantized residual data and decoded pictures. A plurality of interpolated pictures may be generated based on extracting the PRUC data.

23 Claims, 5 Drawing Sheets

METHOD AND SYSTEM FOR MOTION COMPENSATED PICTURE RATE UP-CONVERSION USING INFORMATION EXTRACTED FROM A COMPRESSED VIDEO STREAM

CROSS-REFERENCE TO RELATED APPLICATIONS/INCORPORATION BY REFERENCE

None

FIELD OF THE INVENTION

Certain embodiments of the invention relate to digital video processing. More specifically, certain embodiments of the invention relate to a method and system for motion-compensated picture rate up-conversion (PRUC) using information extracted from a compressed video stream.

BACKGROUND OF THE INVENTION

A major revolution in video display technology includes flat screens based on either liquid crystal display (LCD) or plasma display panel (PDP) technology that are rapidly replacing the cathode ray tube (CRT) technology that served as the primary display device for more than a half a century. A significant consequence of the new video display technologies is that pictures may now be displayed at higher picture-rates with progressive scanning on a flat screen. The new video display technologies may also facilitate a faster transition from standard definition television (SDTV) to high-definition television (HDTV). However, legacy video compression systems still use formats with lower picture-rates and may be unable to optimally display legacy video on modern display screens.

There may be restrictions on channel capacity that may affect the display of low picture-rate pictures. For example, considering a 30 Hz video sequence that may be broadcast over a mobile network, the terminals, for example, mobile phones may receive an encoded video sequence from a server. However, due to bandwidth limitations, only a low bit-rate video sequence may be communicated. As a result, the encoder may remove two out of every three pictures to be transmitted, resulting in a sequence with a picture rate of about 10 Hz, for example. The terminal may be capable of displaying video at 30 Hz but since it receives a 10 Hz video, it may have to perform some form of picture-rate conversion.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for motion-compensated picture rate up-conversion (PRUC) using information extracted from a compressed video stream, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for motion-compensated picture rate up-conversion (PRUC) using information extracted from a compressed video stream. Certain aspects of a method may comprise extracting PRUC data from a compressed video data stream while the compressed video data stream is being decompressed by a video decompression engine. The PRUC data may comprise, for example, local block motion vectors, block coding modes, quantization levels, quantized residual data and decoded pictures. Notwithstanding, the extracted PRUC data may not be so limited. A plurality of interpolated pictures may be generated based on extracting the PRUC data.

Figure 1:
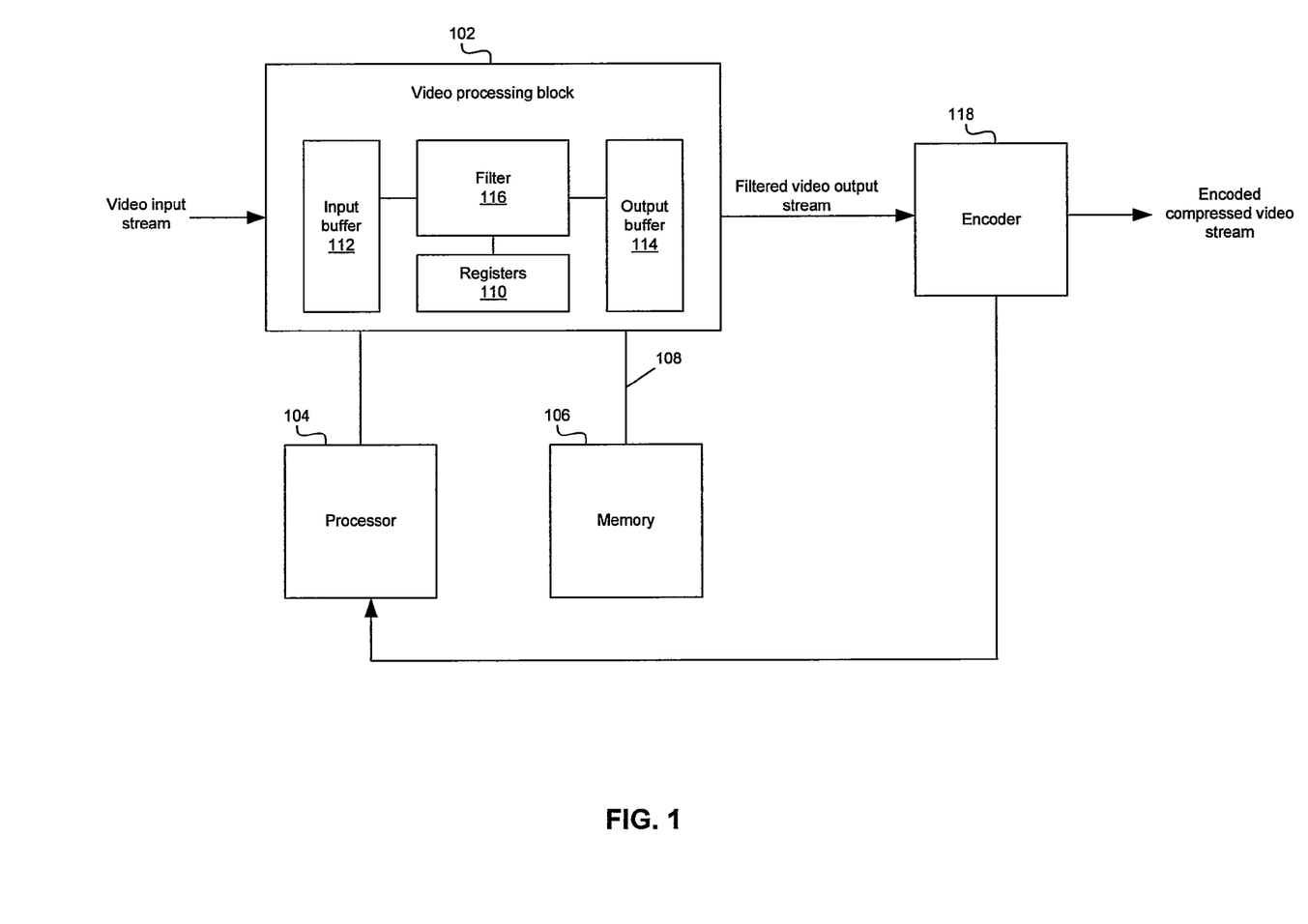
FIG. 1 is a block diagram of an exemplary video processing system, in accordance with an embodiment of the invention.

FIG. 1 is a block diagram of an exemplary video processing system, in accordance with an embodiment of the invention. Referring to FIG. 1, there is shown a video processing block 102, a processor 104, a memory 106, an encoder 118 and a data/control bus 108. The video processing block 102 may comprise registers 110 and filter 116. In some instances, the video processing block 102 may also comprise an input buffer 112 and/or an output buffer 114. The video processing block 102 may comprise suitable logic, circuitry, and/or code that may be enabled to filter pixels in a video picture or a video picture from a video input stream to reduce noise. For example, video frame pictures may be utilized in video systems with progressive video signals while video field pictures may be utilized in video systems with interlaced video signals. Video fields may alternate parity between top fields and bottom fields. A top field and a bottom field in an interlaced system may be deinterlaced or combined to produce a video frame.

The video processing block 102 may be enabled to receive a video input stream and, in some instances, to buffer at least a portion of the received video input stream in the input buffer 112. In this regard, the input buffer 112 may comprise suitable logic, circuitry, and/or code that may be enabled to store at least a portion of the received video input stream. Similarly, the video processing block 102 may be enabled to generate a filtered video output stream to a video decoder and, in some instances, to buffer at least a portion of the generated filtered video output stream in the output buffer 114. In this regard, the output buffer 114 may comprise suitable logic, circuitry, and/or code that may be enabled to store at least a portion of the filtered video output stream.

The filter 116 in the video processing block 102 may comprise suitable logic, circuitry, and/or code that may be enabled to perform filtering operation with noise reduction on the current pixel. In this regard, the filter 116 may be enabled to operate in a plurality of filtering modes, where each filtering mode may be associated with one of a plurality of supported filtering operations. The filter 116 may utilize video content, filter coefficients, threshold levels, and/or constants to generate the filtered video output stream in accordance with the filtering mode selected. In this regard, the video processing block 102 may generate blending factors to be utilized with the appropriate filtering mode selected. The registers 110 in the video processing block 102 may comprise suitable logic, circuitry, and/or code that may be enabled to store information that corresponds to filter coefficients, threshold levels, and/or constants, for example. Moreover, the registers 110 may be enabled to store information that corresponds to a selected filtering mode.

The processor 104 may comprise suitable logic, circuitry, and/or code that may be enabled to process data and/or perform system control operations. The processor 104 may be enabled to control at least a portion of the operations of the video processing block 102. For example, the processor 104 may generate at least one signal to control the selection of the filtering mode in the video processing block 102. Moreover, the processor 104 may be enabled to program, update, and/or modify filter coefficients, threshold levels, and/or constants in at least a portion of the registers 110. For example, the processor 104 may generate at least one signal to retrieve stored filter coefficients, threshold levels, and/or constants that may be stored in the memory 106 and transfer the retrieved information to the registers 110 via the data/control bus 108.

The memory 106 may comprise suitable logic, circuitry, and/or code that may be enabled to store information that may be utilized by the video processing block 102 to reduce noise in the video input stream. The memory 106 may be enabled to store filter coefficients, threshold levels, and/or constants, for example, to be utilized by the video processing block 102.

The encoder 118 may be enabled to receive and process a plurality of statistical inputs from the processor 104 and the video processing block 102. The encoder 118 may be enabled to generate the encoded compressed video stream based on encoding the filtered video output stream.

In operation, the processor 104 may select a filtering mode of operation and may program the selected filtering mode into the registers 110 in the video processing block 102. Moreover, the processor 104 may program the appropriate values for the filter coefficients, threshold levels, and/or constants into the registers 110 in accordance with the selected filtering mode. The video processing block 102 may receive the video input stream and may filter pixels in a video picture in accordance with the selected filtering mode. In some instances, the video input stream may be stored in the input buffer 112 before processing. The video processing block 102 may generate the appropriate blending factors needed to perform the noise reduction filtering operation selected by the processor 104. The video processing block 102 may generate the filtered video output stream after performing the noise reduction filtering operation. In some instances, the filtered video output stream may be stored in the output buffer 114 before being transferred out of the video processing block 102.

The processor 104 may determine the mode of operation of various portions of the video processing block 102. For example, the processor 104 may configure data registers in the video processing block 102 to allow direct memory access (DMA) transfers of video data to the memory 106. The processor 104 may also communicate instructions to an image sensor to initiate capturing of images. The memory 106 may be used to store image data that may be processed and communicated by the processor 104. The memory 106 may also be used for storing code and/or data that may be used by the processor 104. The memory 106 may also be used to store data for other functionalities of the video processing block 102. For example, the memory 106 may store data corresponding to voice communication. The processor 104 may comprise a state machine that may enable determination of whether video data type is interlaced type or progressive type.

Figure 2:
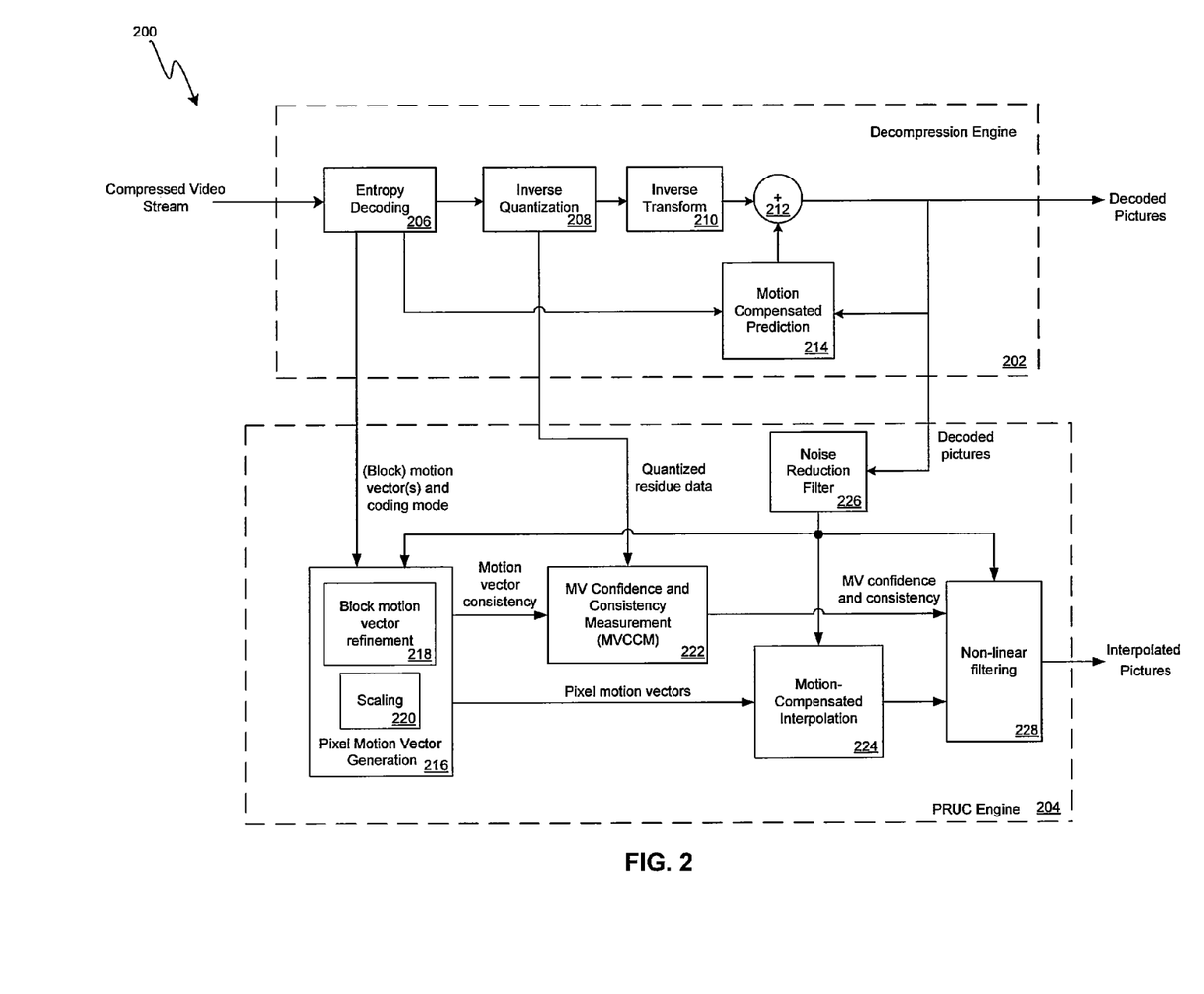
FIG. 2 is a block diagram of an exemplary picture rate up-conversion system, in accordance with an embodiment of the invention.

FIG. 2 is a block diagram of an exemplary picture rate up-conversion system, in accordance with an embodiment of the invention. Referring to FIG. 2, there is shown a video decoding system 200. The video decoding system 200 may comprise a decompression engine 202 and a picture rate up-conversion (PRUC) engine 204. The decompression engine 202 may comprise an entropy decoder 206, an inverse quantization block 208, an inverse transform block 210, a summer 212 and a motion compensated prediction block 214.

The PRUC engine 204 may comprise a pixel motion vector generation block 216, a motion vector confidence and consistency measurement (MVCCM) block 222, a motion compensated interpolation block 224, a noise reduction filer 226 and a non-linear filtering block 228. The pixel motion vector generation block 216 may comprise a block motion vector refinement block 218 and a scaling block 220.

The decompression engine 202 may be a video decoder associated with a particular video standard, for example, MPEG-2, H.264/MPEG-4 AVC, VC1 and VP6. The entropy decoder 206 may comprise suitable logic, circuitry and/or code that may be enabled to receive a compressed video stream from a video encoder, for example, encoder 118. The entropy decoder 206 may be enabled to decode the received compressed video stream corresponding to a particular video standard, for example, MPEG-2, H.264/MPEG-4 AVC, VC1 and VP6. The entropy decoder 206 may be enabled to generate block motion vectors based on decoding the received compressed video stream.

The inverse quantization block 208 may comprise suitable logic, circuitry and/or code that may be enabled to generate quantized residue data. The inverse transform block 210 may comprise suitable logic, circuitry and/or code that may be enabled to generate reconstructed residual pixels to the summer 212.

The motion compensated prediction block 214 may comprise suitable logic, circuitry and/or code that may be enabled to receive one or more motion vectors from the entropy decoder 206 to generate a motion compensated block of pixels. The summer 212 may be enabled to add the motion compensated block of pixels to the reconstructed residual pixels to generate one or more decoded pictures. One or more decoded pictures may be fed back to the motion compensated prediction block 214. The motion compensated prediction block 214 may be enabled to generate the motion compensated block of pixels from a reference image or a previous output picture based on receiving one or more motion vectors from the entropy decoder 206.

The PRUC engine 204 may be enabled to extract information, for example, motion vectors, picture and macroblock coding types and quantized residue data from the video decompression engine 202.

The noise reduction filter 226 may comprise suitable logic, circuitry and/or code that may be enabled to receive a plurality of decoded pictures from the decompression engine 202. The noise reduction filter 226 may be enabled to perform de-blocking, de-ringing, or other noise reduction filtering on the received decoded pictures. The noise reduction filter 226 may generate a filtered output to the pixel motion vector generation block 216, the motion compensated interpolation block 224 and the non-linear filtering block 228.

Blockiness artifact may be caused by distorting the distribution or spectrum of the block transform domain by a quantizer. The blockiness artifact may be related to a lower spectrum coefficient or frequency distortion by the quantization. The blockiness artifact may be visible on the block boundaries, for example, 8×8 pixels for MPEG 1, 2 and 4 and both 4×4 pixels and 8×8 pixels for MPEG4 part10 AVC, for example. The blockiness artifact may be perceived in flat texture areas in a given picture or video, for example.

The ringing encoding artifact may be also referred to as a mosquito artifact and may be caused by distorting the distribution and/or spectrum of the block transform domain, by a quantizer. The ringing encoding artifact may be related to a higher spectrum coefficient or frequency distortion by the quantization. The ringing encoding artifact may be visible on edges or text boundaries with a flat texture area, for example.

The pixel motion vector generation block 216 may comprise suitable logic, circuitry and/or code that may be enabled to receive extracted block motion vectors and coding modes from the entropy decoder 206. The pixel motion vector generation block 216 may be enabled to determine local block motion vectors and a global motion vector and determine the interpolation and filtering modes. The pixel motion vector generation block 216 may be enabled to accumulate the plurality of block motion vectors in order to estimate a global motion vector (GMV). The pixel motion vector generation block 216 may be enabled to sort motion vectors into a histogram and generate the GMV.

The block motion vector refinement block 218 may comprise suitable logic, circuitry and/or code that may be enabled to refine the motion vectors extracted from the compression video stream and decompose the block motion vectors into pixel motion vectors. The block motion vector refinement block 218 may be enabled to perform a local refinement search and the motion vectors may be refined to sub-pixel precision, for example.

The scaling block 220 may comprise suitable logic, circuitry and/or code that may be enabled to scale the generated motion vectors for interpolated or inserted pictures. The pixel motion vector generation block 216 may be enabled to generate pixel motion vectors, for example, using a local adaptive non-linear filter. The pixel motion vector generation block 216 may be enabled to measure the local motion vector consistency value.

The MVCCM block 222 may comprise suitable logic, circuitry and/or code that may be enabled to measure the extracted quantized residue data and the quantization level. The MVCCM block 222 may be enabled to generate a motion vector consistency value by comparing adjacent block motion vectors and motion-compensated block boundary pixel differences. For example, smaller quantization levels with less residue data may result in higher motion vector confidence while larger quantization levels and higher residue data may generate lower motion vector confidence. The MVCCM block 222 may be enabled to generate a motion vector confidence value and a motion vector consistency value to the non-linear filtering block 228.

The motion compensated interpolation block 224 may comprise suitable logic, circuitry and/or code that may be enabled to utilize the scaled local and global motion vectors and the noise reduced decoded pictures to generate the interpolated or inserted pictures. The motion compensated interpolation block 224 may be enabled to pass the generated interpolated pictures to the non-linear filtering block 228.

The non-linear filtering block 228 may comprise suitable logic, circuitry and/or code that may be enabled to filter the received interpolated pictures to reduce artifacts in the final output interpolated pictures. The non-linear filtering block 228 may be enabled to utilize the motion vector confidence and consistency measurement value to determine whether motion compensated interpolation is likely to fail. If the non-linear filtering block 228 determines that the motion compensated interpolation is likely to fail, the PRUC engine 204 may be enabled to switch off picture interpolation across scene changes and continue repeating previous pictures.

In operation, the decompression engine 202 may be enabled to receive compressed video streams comprising low picture rates and decompress the received compressed video streams. The PRUC engine 204 may be enabled to perform PRUC using motion vectors and other coding information extracted from the compressed video streams. The PRUC engine 204 may be enabled to generate high picture rate interpolated pictures in progressive scanning for display on a modern video display screen, for example, LCD screen or PDP screen.

Digital video compression algorithms, for example, MPEG-2, MPEG-4, VC1 and VP6 may allow forward and backward predictive and bidirectional predictive coding that may result in the generation of P and B pictures respectively. Motion compensated predictive coding may be enabled to exploit the temporal correlation between consecutive pictures. The video compression encoder 118 may generate motion vectors (MV) between pictures within an allowed temporal window. These motion vectors may be utilized for motion compensation in video compression encoding and decoding processes. In the compressed video stream, the motion compensated information, for example, macroblocks may comprise coded motion vector data and transformed residual data.

An artifact known as motion judder may result when the picture rate of a video stream is low. Motion judder may be due to the temporal sampling rate being low to accurately describe motion in a scene. The motion compensated interpolation block 224 may be enabled to reduce motion judder. The motion compensated interpolation block 224 may be enabled to modify the processing of a picture rate converter so that it may follow moving objects similar to the human eye. The picture may appear clean and sharp as it moves without the motion judder. The PRUC engine 204 may be enabled to analyze a stream of input pictures to identify each object in the scene to determine how the object may be moving. The PRUC engine 204 may be enabled to interpolate the location of the plurality of objects at different time instants to generate each output picture.

The PRUC engine 204 may be enabled to interpolate additional intermediate pictures between coded pictures instead of repeating earlier coded pictures. Motion compensated interpolation may be similar to the generation of predicted pictures, for example, P pictures and B pictures during video compression. In accordance with an embodiment of the invention, the PRUC engine 204 may not require the transmission of motion vector and residual data to generate one or more interpolated pictures. One or more display devices may perform their own PRUC from the compressed video stream with no additional information other than receiving decoded pictures.

A plurality of interpolated motion vectors may be utilized for isolated macroblocks without motion vectors, for example, intra macroblocks. In accordance with an embodiment of the invention, the PRUC engine 204 may be enabled to switch-off frame interpolation across scene changes and repeat the previous frame. The non-linear filtering block 228 may be enabled to utilize motion adaptive weighted median filtering, for example, to generate interpolated pictures between an I picture and a previous P picture.

Figure 3A:
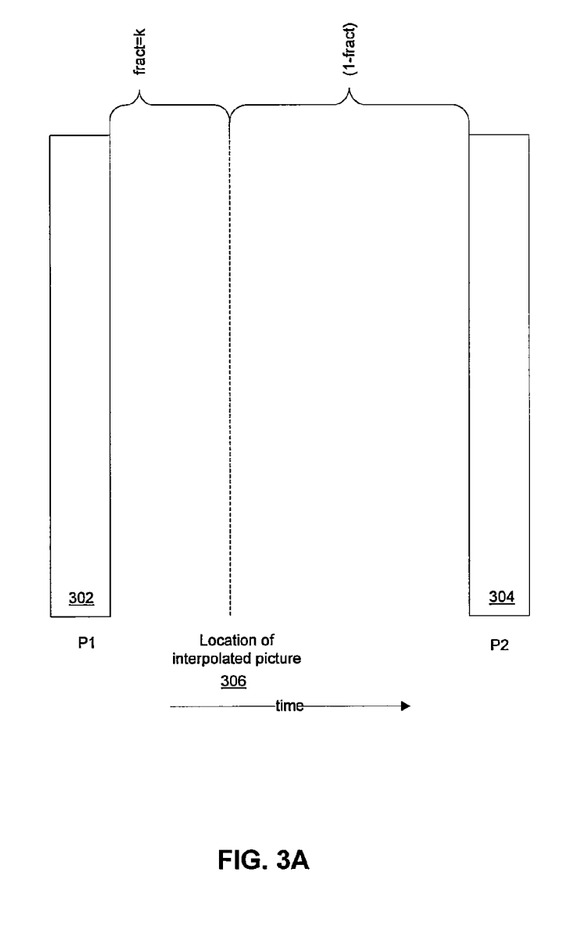
FIG. 3A is a block diagram illustrating insertion of an exemplary interpolated picture between two pictures, in accordance with an embodiment of the invention.

FIG. 3A is a block diagram illustrating insertion of an exemplary interpolated picture between two pictures, in accordance with an embodiment of the invention. Referring to FIG. 3A, there is shown a plurality of coded pictures, for example, P1 302 and P2 304 and the location of an interpolated picture 304. For example, the interpolated picture 304 may be inserted k time units from the coded picture P1 302.

Figure 3B:
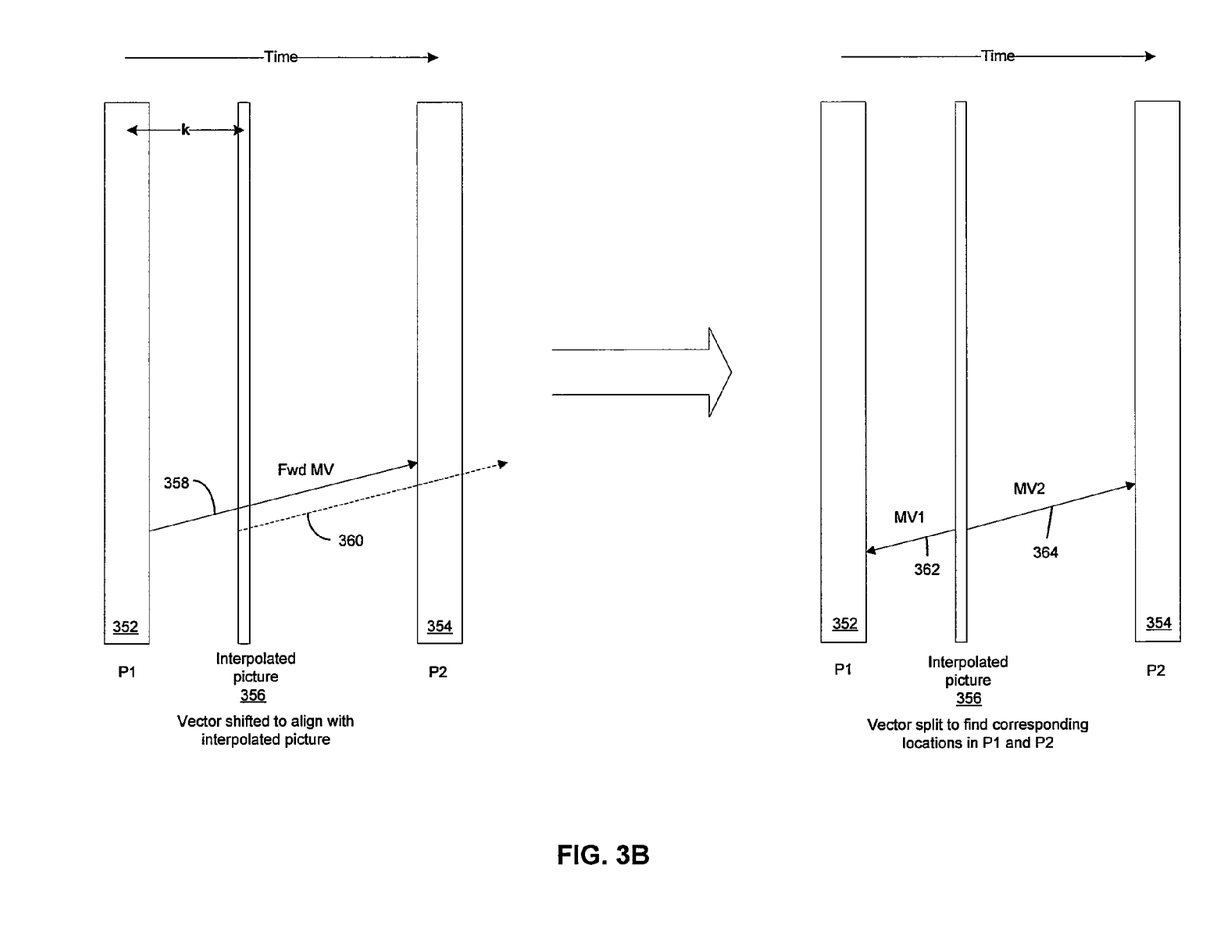
FIG. 3B is a block diagram illustrating exemplary motion vectors of an interpolated picture, in accordance with an embodiment of the invention.

FIG. 3B is a block diagram illustrating exemplary motion vectors of an interpolated picture, in accordance with an embodiment of the invention. Referring to FIG. 3B, there is shown a plurality of coded pictures, for example, P1 352 and P2 354 and an interpolated picture 356. For example, the interpolated picture 356 may be inserted k time units from the coded picture P1 352.

A motion vector 358 may point from an area in the previous picture P1 352 to an area in the next picture P2 354, in such a way that the motion vector 358 may capture the motion that occurred between the two original pictures P1 352 and P2 354. The motion vector 360 may be a shifted version of motion vector 358. The motion vector 360 may be shifted to align with the interpolated picture 356.

The motion vector 360 may be split into two motion vectors, for example, MV1 362 and MV2 364. Each of the estimated motion vectors, for example, motion vector 360 may be split and scaled for motion compensated interpolation. The directions of the two scaled motion vectors, for example, MV1 362 and MV2 364 may be opposite to each other. The length of the scaled motion vector, for example, MV1 362 may be proportional to the temporal difference between the interpolated picture 356 and the original picture P1 352. The length of the scaled motion vector, for example, MV2 364 may be proportional to the temporal difference between the interpolated picture 356 and the original picture P2 354.

Figure 4:
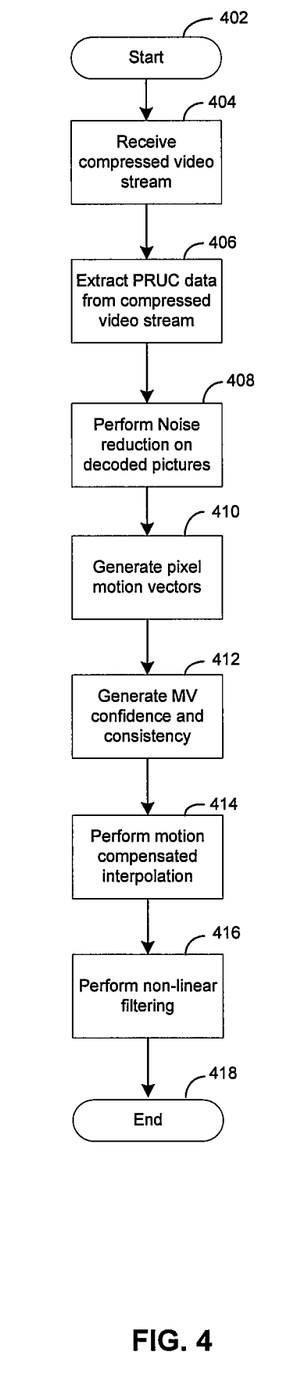
FIG. 4 is a flowchart illustrating exemplary steps for motion-compensated picture rate up-conversion (PRUC) using information extracted from a compressed video stream, in accordance with an embodiment of the invention.

FIG. 4 is a flowchart illustrating exemplary steps for motion-compensated picture rate up-conversion (PRUC) using information extracted from a compressed video stream, in accordance with an embodiment of the invention. Referring to FIG. 4, exemplary steps may begin at step 402. In step 404, a decompression engine 202 may be enabled to receive a compressed video data from an encoder 118. In step 406, a PRUC engine 204 may be enabled to extract PRUC data from the compressed video data while the compressed video data is being decompressed by the decompression engine 202. The PRUC data may comprise, for example, local block motion vectors, block coding modes, quantization levels, quantized residual data and decoded pictures. Notwithstanding, the extracted PRUC data may not be so limited. In step 408, the noise reduction filer 226 may be enabled to perform digital noise reduction filtering on the extracted decoded pictures.

In step 410, the pixel motion vector generation block 216 may be enabled to receive a plurality of block motion vectors from the video decompression engine 202 and generate pixel motion vectors based on refining and scaling the received plurality of block motion vectors. In step 412, the MVCCM block 222 may be enabled to generate a motion vector confidence and consistency measurement value. In step 414, the motion compensated interpolation block 224 may be enabled to perform motion compensated interpolation in order to generate interpolated pictures. In step 416, the non-linear filtering block 228 may be enabled to detect scene changes and filter the interpolated pictures to reduce artifacts in the final output interpolated pictures. Control then passes to end step 418.

In accordance with an embodiment of the invention, a method and system for motion-compensated picture rate up-conversion (PRUC) using information extracted from a compressed video stream may comprise a PRUC engine 204 that may be enabled to extract PRUC data from a compressed video data stream while the compressed video data stream is being decompressed by the video decompression engine 202. The PRUC data may comprise, for example, local block motion vectors, block coding modes, quantization levels, quantized residual data and decoded pictures. Notwithstanding, the extracted PRUC data may not be so limited. The PRUC engine 204 may be enabled to generate a plurality of interpolated pictures based on the extracted PRUC data.

The decompression engine 202 may be enabled to generate the decoded pictures based on decompressing the compressed video data stream. The PRUC engine 204 may comprise a pixel motion vector generation block 216, a motion vector confidence and consistency measurement (MVCCM) block 222, a motion compensated interpolation block 224, a noise reduction filer 226 and a non-linear filtering block 228. The pixel motion vector generation block 216 may comprise a block motion vector refinement block 218 and a scaling block 220.

The noise reduction filer 226 may be enabled to perform digital noise reduction filtering on the extracted decoded pictures in order to reduce noise. The pixel motion vector generation block 216 may be enabled to generate one or more motion vectors based on the received block motion vectors. The generated motion vectors may comprise one or more local motion vectors and a global motion vector. The pixel motion vector generation block 216 may be enabled to accumulate a plurality of block motion vectors in order to generate the global motion vector.

The scaling block 220 may be enabled to scale the generated motion vectors. The pixel motion vector generation block 216 may be enabled to generate pixel motion vectors based on the scaling of the generated motion vectors. The MVCCM block 222 may be enabled to generate at least one of a confidence value and a consistency value of the generated motion vectors based on the quantized residue data extracted from the video decompression engine 202.

The motion compensated interpolation block 224 may be enabled to generated motion compensated interpolated pictures. The non-linear filtering block 228 may be enabled to filter the generated interpolated pictures in order to reduce artifacts in the final output interpolated pictures.

Another embodiment of the invention may provide a machine-readable storage, having stored thereon, a computer program having at least one code section executable by a machine, thereby causing the machine to perform the steps as described herein for motion-compensated picture rate up-conversion (PRUC) using information extracted from a compressed video stream.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, the method comprising:
    in a video decoder comprising a video decompression engine and a picture rate up-conversion (PRUC) engine:
        receiving, by said video decompression engine, compressed video data comprising a plurality of input pictures;
        extracting, by said PRUC engine, PRUC data from said compressed video data while said compressed video data is being decompressed by said video decompression engine, wherein extracting said PRUC data from said compressed video data comprises receiving said PRUC data from said video decompression engine, wherein at least a portion of said PRUC data is generated by said video decompression engine according to said compressed video data; and
        generating, by said PRUC engine, a plurality of interpolated pictures based on said PRUC data.

2. The method according to claim 1, wherein said PRUC data comprises at least one of a plurality of block motion vectors, a plurality of block coding modes, a plurality of quantization levels, quantized residual data, or a plurality of decoded pictures.

3. The method according to claim 2, comprising generating, by said video decompression engine, said plurality of decoded pictures based on decompression of said compressed video data.

4. The method according to claim 2, comprising filtering, by said PRUC engine, said plurality of decoded pictures to reduce noise.

5. The method according to claim 2, comprising generating, by said PRUC engine, one or more motion vectors based on said plurality of block motion vectors, wherein said one or more motion vectors comprises one or more local motion vectors and a global motion vector.

6. The method according to claim 5, comprising accumulating said plurality of block motion vectors to generate said global motion vector.

7. The method according to claim 5, comprising scaling, by said PRUC engine, said one or more motion vectors.

8. The method according to claim 7, comprising generating, by said PRUC engine, one or more pixel motion vectors based on said scaling.

9. The method according to claim 5, comprising generating, by said PRUC engine, at least one of a confidence value or a consistency value of said one or more motion vectors based on said quantized residual data.

10. The method according to claim 1, comprising motion compensating, by said PRUC engine, said plurality of interpolated pictures.

11. The method according to claim 10, comprising nonlinear filtering, by said PRUC engine, said plurality of interpolated pictures.

12. The method according to claim 1, further comprising identifying, by said PRUC engine, a plurality of objects in said plurality of input pictures, wherein said plurality of interpolated pictures are generated by interpolating a location of said plurality of objects at a plurality of time instants.

13. A system, the system comprising:
    a video decoder comprising a video decompression engine and a picture rate up-conversion (PRUC) engine;
    wherein said video decompression engine comprises one or more circuits operable to perform a decompression process on compressed video data received by said video decompression engine, said compressed video data comprising a plurality of input pictures, and to generate PRUC data using said compressed video data; and
    wherein said PRUC engine comprises one or more circuits operable to receive said PRUC data from said video decompression engine and generate a plurality of interpolated pictures based on said PRUC data, wherein said PRUC data is received by said PRUC engine from said video decompression engine during said decompression process of said compressed video data.

14. The system according to claim 13, wherein said PRUC data comprises at least one of a plurality of block motion vectors, a plurality of block coding modes, a plurality of quantization levels, quantized residual data or a plurality of decoded pictures.

15. The system according to claim 14, wherein said one or more circuits in said video decompression engine are operable to generate said plurality of decoded pictures based on said decompression process of said compressed video data.

16. The system according to claim 14, wherein said one or more circuits in said PRUC engine are operable to filter said plurality of decoded pictures to reduce noise.

17. The system according to claim 14, wherein said one or more circuits in said PRUC engine are operable to generate one or more motion vectors based on said plurality of block motion vectors.

18. The system according to claim 17, wherein said one or more motion vectors comprises one or more local motion vectors and a global motion vector.

19. The system according to claim 18, wherein said one or more circuits in said PRUC engine are operable to accumulate said plurality of block motion vectors to generate said global motion vector.

20. The system according to claim 17, wherein said one or more circuits in said PRUC engine are operable to generate one or more pixel motion vectors based on scaling of said one or more motion vectors.

21. The system according to claim 17, wherein said one or more circuits in said PRUC engine are operable to generate at least one of a confidence value or a consistency value of said one or more motion vectors based on said quantized residual data.

22. The system according to claim 13, wherein said one or more circuits in said PRUC engine are operable to motion compensate said plurality of interpolated pictures.

23. The system according to claim 22, wherein said one or more circuits in said PRUC engine are operable to non-linear filter said motion compensated said plurality of interpolated pictures.

\* \* \* \* \*